(No Model.)

E. WALSH, Jr.

GLASS AND OTHER FURNACES OF THE REGENERATOR TYPE.

No. 320,516. Patented June 23, 1885.

Attest:
J. W. Riddle
J. L. Hornsby

Inventor:
Edward Walsh Jr.
by Paul Bakewell
his attorney

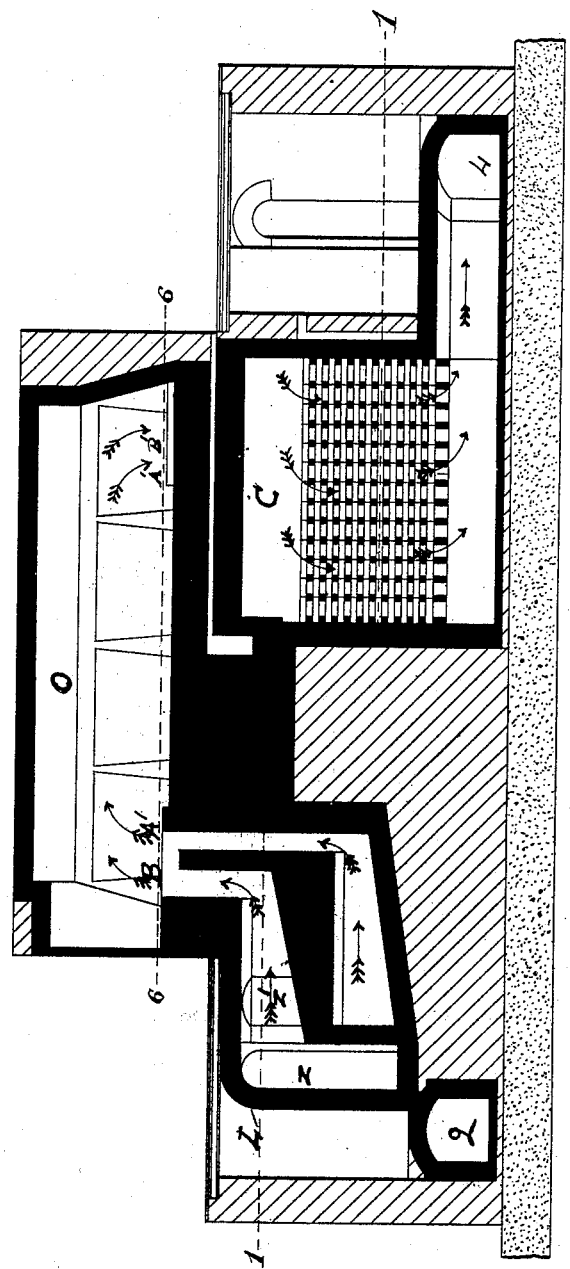

(No Model.)

E. WALSH, Jr.

GLASS AND OTHER FURNACES OF THE REGENERATOR TYPE.

No. 320,516. Patented June 23, 1885.

Attest:
J. W. Riddle
J. L. Hornsby

Inventor:
Edward Walsh Jr.
G. Paul Bakewell
his attorney (No Model.)

E. WALSH, Jr.

GLASS AND OTHER FURNACES OF THE REGENERATOR TYPE.

No. 320,516. Patented June 23, 1885.

Attest:
J. W. Riddle
J. R. Hornsby

Figure 8:
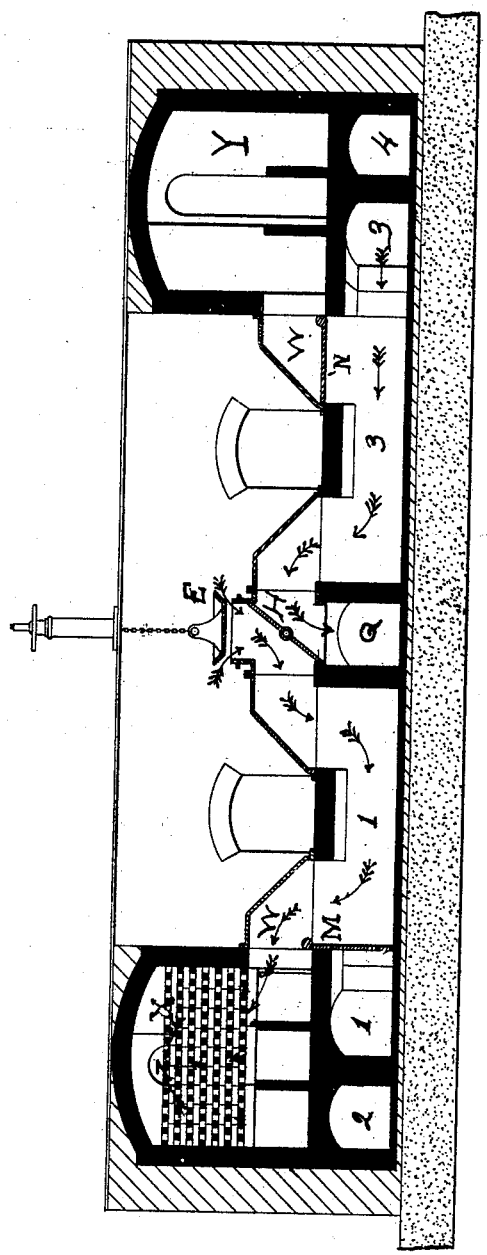

Inventor:
Edward Walsh Jr.
G. Paul Bakewell
his attorney (No Model.)
5 Sheets—Sheet 5.
E. WALSH, Jr.
GLASS AND OTHER FURNACES OF THE REGENERATOR TYPE.
No. 320,516. Patented June 23, 1885.
*Fig. 6.*
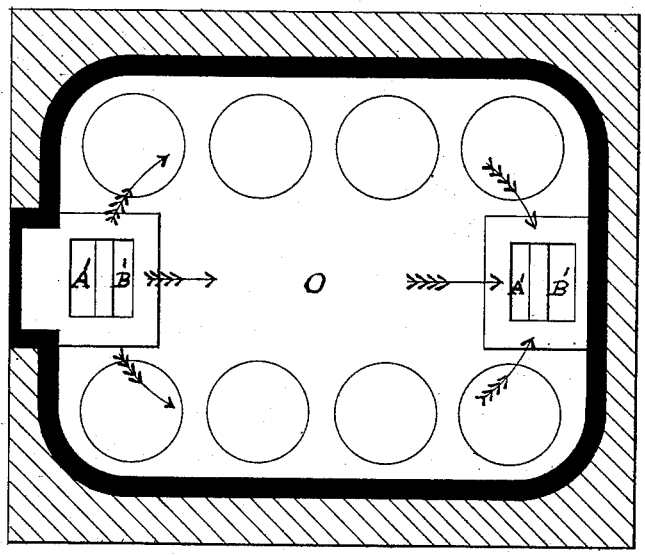
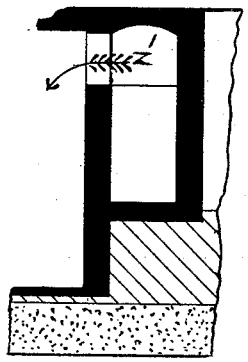 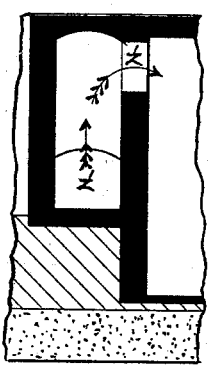 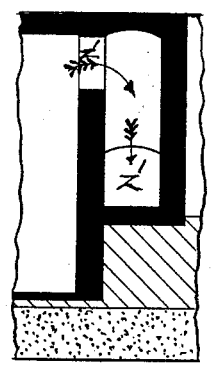 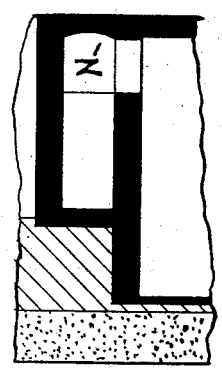
*Fig. 7.*    *Fig. 8.*    *Fig. 9.*    *Fig. 10.*
*Fig. 11.*
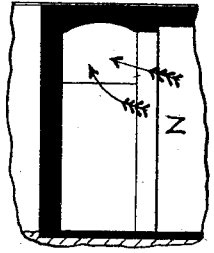
Attest:
J. W. Riddle
J. S. Hornsby
Inventor:
Edward Walsh Jr.
by Paul Bakewell
his attorney

UNITED STATES PATENT OFFICE.

EDWARD WALSH, JR., OF ST. LOUIS, MISSOURI.

GLASS AND OTHER FURNACES OF THE REGENERATOR TYPE.

SPECIFICATION forming part of Letters Patent No. 320,516, dated June 23, 1885.

Application filed December 15, 1884. (No model.)

*To all whom it may concern:*

Be it known that I, EDWARD WALSH, Jr., a citizen of the United States, residing in the city of St. Louis, State of Missouri, have invented a certain new and useful Improvement in Glass and other Furnaces of the Regenerator Type of the character known in the art as the "Siemens Gas-Furnace;" and I do hereby declare the following to be a full, clear, and exact description of the invention, which will enable others skilled in the art to which it appertains to make and use the same, reference being had to the accompanying drawings, making part of this specification, in which drawings—

Figure 1:
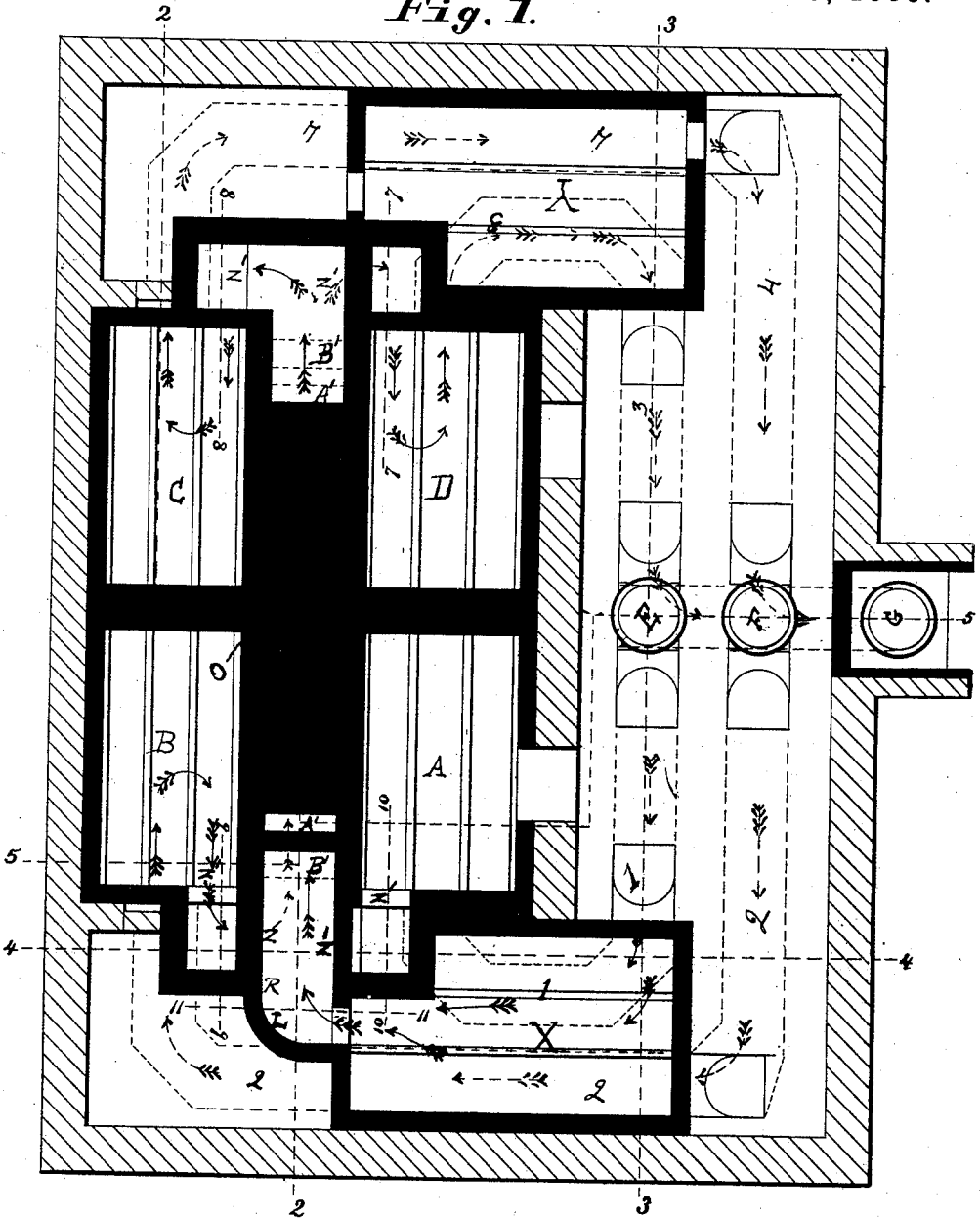
Figure 4:
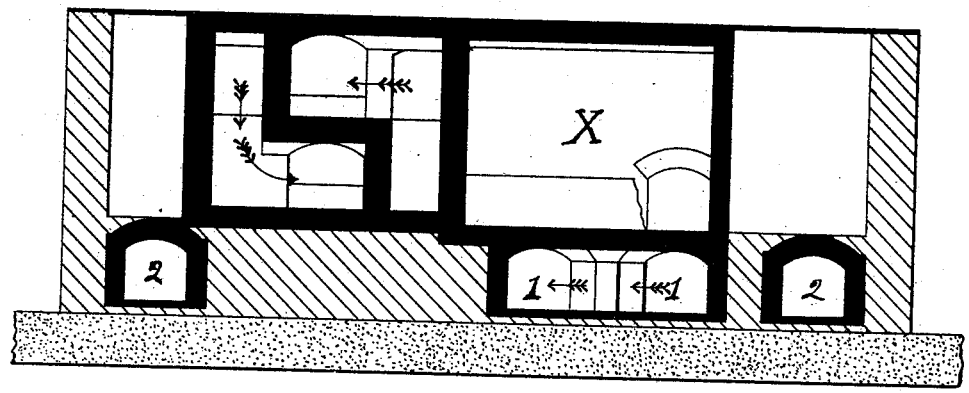
Figure 5:
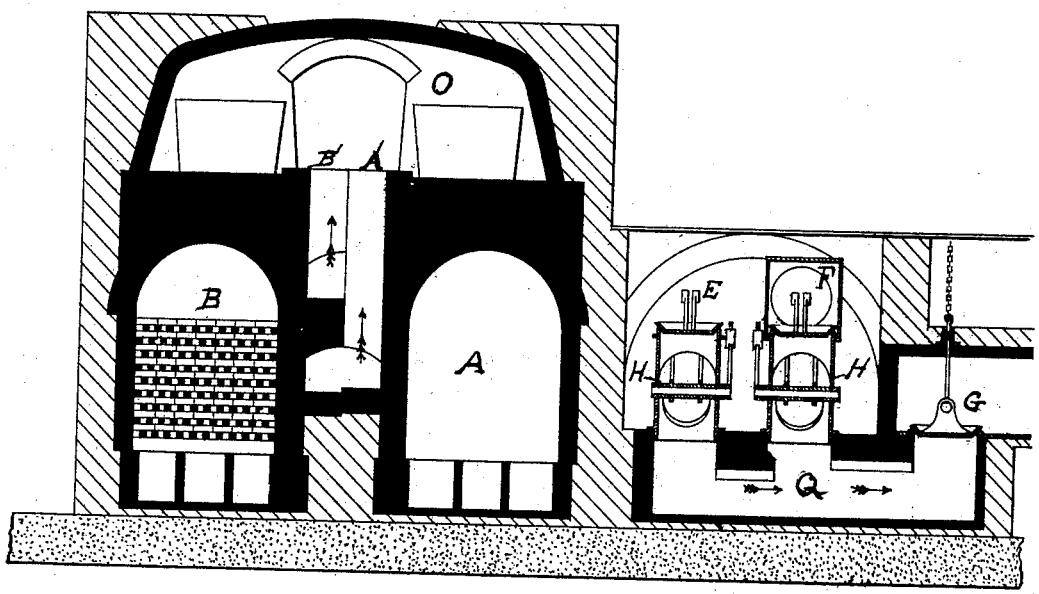

Figure 1 is a horizontal section of a furnace of the character mentioned having my improvement. It is a horizontal section on line 1 1 of Fig. 2 of the drawings; Fig. 2, a vertical section on line 2 2, Fig. 1; Fig. 3, a vertical section on line 3 3 of Fig. 1; Fig. 4, a vertical section on line 4 4, Fig. 1; Fig. 5, a vertical section on line 5 5, Fig. 1. Fig. 6 is a section on the line 6 6, Fig. 2. Figs. 7, 8, 9, 10, and 11 are sections on the lines 7 7, 8 8, 9 9, 10 10, and 11 11, respectively, of Fig. 1.

The above drawings refer to an application of my invention to a Siemens gas eight-pot glass-furnace.

Similar letters indicate corresponding parts in the several drawings.

This invention relates to the construction of a glass-furnace with a view to increasing the yield in a given time, by obviating the frequent stopping of the furnace for repairs, which of necessity takes place in the well-known Siemens furnace as heretofore constructed; and my invention consists of auxiliary regenerator-chambers so arranged with relation to the ordinary or main regenerator-chambers and with relation to the air and gas flues that these auxiliary chambers may be thrown into use and used instead of one of the main regenerators, when it may be desirable to repair a regenerator-chamber, and this to be done without interfering with the working of the furnace; and practice has shown that a furnace constructed upon the principle of my invention and in the following described manner can be used continuously for about five times the length of time that the ordinary Siemens furnace can be used.

In order to enable those skilled in the art to fully understand the object of this invention, I will first point out the disadvantages of the Siemens furnace in common use.

In such furnace the air passes, by means of conduit-pipe corresponding to conduit-pipe marked 1 in Fig. 1, into a regenerator-chamber corresponding to regenerator-chamber marked A in Fig. 1, up through checker-work (not shown) in regenerator A, and thence into furnace corresponding to furnace marked O in Fig. 1, and the gas, by means of a conduit corresponding to conduit marked 2 in Fig. 1 passes into a regenerator corresponding to regenerator marked B in Fig. 1, up through the checker-work (not shown) in Fig. 1, and thence into the furnace. The gas and air coming together in furnace O combustion takes place, and action is then had upon the contents of the glass-pots in the furnace. The products of combustion are then drawn out from the furnace by a draft which causes these products of combustion from the furnace through the regenerators, filled with checker-work, (not shown) corresponding to regenerators C and D in Fig. 1, down to flues or conduit-pipes corresponding to conduit-pipes 3 and 4 in Fig. 1 to draft-stack.

The draft which operates the furnace—that is to say, which draws the gas and air into the furnace and then draws the products of combustion out from the furnace—is created by means of a large draft-stack, not shown, but the entrance to the draft-stack and the valve which regulates the draft is shown at G, Figs. 1 and 5.

The direction of the air and gas and the products of combustion herein described may be reversed at will by suitable valve arrangements, and instead of acting at passages for exit of draft the conduits 3 and 4 can be used as air and gas flues, respectively, in which case regenerators C and D would respectively act as chambers through which gas and air would be conducted to the furnace.

This substantially shows to those skilled in the art the working arrangement of the regenerator-chambers in the Siemens furnace in common use, at least well enough for the purpose of showing my improvement.

The disadvantages in the arrangement of a furnace, as above described, are these: In the working of glass-furnaces constructed upon the Siemens principle a certain amount of fume and salts from the glass-pots pass out with the heat into chambers corresponding to regenerators C and D or A and B, as the case may be, and dropping upon the checker-work not shown in Fig. 1 but shown in Figs. 2, 3, and 5, gradually forms incrustations, which fill up the interstices between the bricks forming the checker-work, thus impairing the draft; also, the intense heat which passes from the furnace through these regenerators frequently fuses the bricks forming the checker-work. The result of this incrustation and this fusion of the checker-work is that practically about every six months the operation of the entire furnace must be stopped to repair one or the other of these regenerators and renew the checker-work.

My invention consists in devising a means by which the operation of the furnace need not be at all suspended to reconstruct a regenerator which has become useless from the above causes, but on the contrary the operation of the furnace can be kept on at the same time that the regenerator which has become out of repair is being reconstructed, thus enabling the furnace to be kept in continuous operation until the structure as an entirety becomes out of repair, which in practice is about every two or three years; and the means that I have invented for accomplishing these results are auxiliary regenerator-chambers, and the means of connecting these auxiliary regenerators with the air, gas, and draft conduits or flues and the furnace, and the means for throwing these auxiliary regenerators into or out of use at will.

The construction of a furnace upon my improved plan is as follows:

In the drawings, A B C D are the main regenerators; O, the furnace proper; 1 and 3, the air conduits or flues; 2 and 4, the gas conduits or flues; but, as stated hereinbefore in describing construction of Siemens furnace, while 1 and 2 act respectively as conduits for air and gas, flues 3 and 4, communicating with draft-stack, act as conduits for the utilized products of combustion on their way to draft-stack; and this can be reversed, so that air and gas pass through conduits 3 and 4 to regenerators, and the draft passes out through conduits 1 and 2 to draft-stack. E and F are valves which regulate the currents of air or gas, and G a valve which regulates the draft at the entrance to the draft-stack.

Thus far in this description I have shown nothing that is not peculiar to the construction of the well-known Siemens furnace; but the following letters refer to parts peculiar to my improvement:

X Y are my auxiliary regenerator-chambers; A' B', ports or openings situated at opposite sides of the furnace O, and these ports are two in number, at each of the opposite ends of the furnace O at which they are situated. These ports are entrances for the gas and air at one end of the furnace, and exits for the products of combustion at the other, and are connected, at the points severally Z in the drawings, with the regenerators A B C D X or Y, as desirable, by means of crooked channels or passage-ways, sections of which are shown in Figs. 7, 8, 9, 10, and 11 of the drawings.

Fig. 3, as before stated, is a vertical section on the line 3 3 of Fig. 1—that is to say, it is a vertical section on line 3 3, Fig. 1—showing the interior arrangement at that point of auxiliary chambers X and Y and flues or conduits 1 and 3. It shows auxiliary chamber X in use, and in connection with flue 1, and also shows the connection between chamber A and flue 1 as cut off; and it shows auxiliary chamber Y out of use and cut off from flue 3, flue 3 being in connection with chamber D; and this view also shows the means of throwing chambers X or A into or out of connection with flue 1 at will, and the means of throwing chambers Y or D into or out of connection with flue 3 at will; and it also shows the entrance and course of the air into and through the flues and chambers, and the course of the products of combustion in their exit from the furnace. This view also shows the manner of changing the flues 1 and 3 into outlet flues or conduits for the draft on its way from the furnace, or for inlet flues or conduits for the air into and through chambers X or A, or chambers Y or D into furnace O. The connections and principles of operation between flues 2 and 4, (the flues that are used as inlets for gas or outlets for the draft,) and auxiliary chamber X or chamber B, and auxiliary chamber Y or chamber C, are the same as shown in this view, Fig. 3, cut through the line of flues 1 and 3. Now, in this Fig. 3, H is a butterfly-valve placed just below air-valve E, and this butterfly-valve H directs the entrance of the air into flues 1 or 3, or the exit of the draft through flues 1 or 3. A like butterfly-valve shown in Fig. 5, and also marked H, directs, in the same manner, the entrance of the gas into flue 2 or 4, or the exit of the draft through flue 2 or 4. In the drawings, Fig. 3, this butterfly-valve is thrown into such a position that it permits the air to pass into flue 1, and through flue 1 and auxiliary chamber X into furnace O; and with butterfly-valve in the position shown in Fig. 3, flue 3 is shut off from connection with air-opening controlled by valve E; but flue 3 is thrown into connection with opening Q, (opening to draft-stack,) through which a constant draft is working, which carries the products of combustion to the outside air. This opening Q is shown in Figs. 3 and 5, and the valve controlling draft at entrance to draft-stack is shown at G, Figs. 1 and 5.

M and N are hinged doors, which are raised into the position of door N in Fig. 3 when it is desirable not to use an auxiliary chamber; but when it is desirable to use an auxiliary chamber instead of one of the main chambers the door is dropped in the position of door M in Fig. 3, thus closing connection of flue with main chamber, and leaving an opening for air or gas, as the case may be, only into the auxiliary chamber and through it to the furnace O.

The lines of flues or conduits 1 and 3 and 2 and 4 are shown in drawings and in dotted lines in Fig. 1; and with the auxiliary chambers out of use the separate currents of air and gas on one side, and the currents of draft on the other side, pass through these flues entirely under auxiliary chambers X and Y; but when an auxiliary chamber is in use the current of air or gas or the draft, as the case may be, is broken from its regular course, and that current passes up into an opening in the flue, above the regular line of the flue, into the auxiliary chamber, as shown at W W, Fig. 3. This opening W is made by a covering of any suitable material, built so as to rest against the wall of the auxiliary chamber at one end, and resting upon top of flue at the other end and covering an opening in the auxiliary chamber and an opening in the flue, the latter opening being of the same size and section as the body of the flue, so that the hinged doors M and N may completely close this opening and shut off connection with auxiliary chamber when door is raised as in position of door N, or open complete connection with auxiliary chamber and close connection of flue with main chamber when door is in position of door M, Fig. 3.

The course of the currents of air or gas from the regenerators to the furnace O, and the course of the draft from the furnace O to the regenerators in passing out, is shown as passing along the lines of crooked channels. (Shown by the directions of the arrows in the several views, but particularly in Figs. 2, 4, 5, 7, 8, 9, 10, and 11.) The course of flues or conduits 2 and 4 is shown in dotted lines in Fig. 1, and sections of them are shown in Figs. 2, 3, and 4.

The arrangement for throwing flues 2 and 4 into or out of connection with auxiliary chambers or into or out of connection with main chambers are precisely the same as those shown and described in connection with flues 1 and 3.

L, Fig. 1, shows a temporary brick wall or arch built around from an opening in auxiliary chamber X to a point, R, of wall of main chamber B. This wall and arch establish connection between openings to ports leading into furnace O and opening Z of auxiliary chamber X. This wall and arch are built of any suitable material, and can be torn down when auxiliary chamber is out of use. A like connection, L, is built between auxiliary regenerator Y and regenerator C when it is desirable to use regenerator Y.

When the auxiliary chambers are in use, the opening Z' of the main chamber not in use is closed up by suitable fire-brick tile to prevent currents of air, gas, or draft from entering in this chamber. This is shown in Fig. 2, where air is passing into port B' from auxiliary regenerator X, and gas is passing into port A' from main regenerator B; but main regenerator A being out of use, opening Z' of regenerator A (shown in this figure) in practice would be closed.

The operation of the furnace in the use of my improvement is as follows: Air and gas entering at the points indicated by valves E F in the ordinary manner, passing along their separate flues or conduits, as shown by direction of arrows, Fig. 1, and, say chamber A needs repairs, door M in flue is dropped into position of door M in Fig. 3, and the air or gas, as the case may be, passes up through opening W into auxiliary chamber, through the checker-work in auxiliary chamber X, and out through opening Z at top of said chamber, as shown by direction of arrows, Fig. 3, and then directed by connection L, built to cover opening Z of auxiliary chamber X, the current of air or gas passes through channels in the direction of the arrows in Figs. 1, 2, and 11 up into the port leading into furnace O, and in furnace O the separate currents of air and gas combine and combustion takes place, and the products of combustion pass out through ports at other end of furnace, and then through regenerators C and D, thereby heating them, and through flues 3 and 4, along direction of arrows, to opening Q, draft-stack, and thence out through draft-stack to open air; but should main chambers C or D be out of order and auxiliary chamber in use, the products of combustion would pass through chamber Y in their exit from furnace O, and door N would be dropped in position of door M of Fig. 3, and products of combustion, after passing through chamber Y, would pass by way of opening W into flue 3 or flue 4, depending upon which of main chambers was not used, into opening Q of draft-stack, and thence through draft-stack to open air.

The direction of the draft, and consequently the direction of the course of the air and gas and products of combustion, is regulated by the butterfly-valves H H, situated midway between flues 1 and 2 and flues 2 and 4. When butterfly-valves H H are in position of butterfly-valve H, Fig. 3, the air and gas are passing into regenerators by means of flues or conduits 1 and 2, and the products of combustion are passing out through flues or conduits 3 and 4 and entrance Q to draft-stack; but when butterfly-valves are reversed the currents of air and gas pass through flues 3 and 4 into regenerators, and the products of combustion pass out through flues 1 and 2 to opening Q to draft-stack.

I do not desire to claim, broadly, devices for disconnecting one pair of regenerators from the furnace and connecting the regenerators of the other pair so as to work with the regenerators of one side while the other set is out of service for repairs.

Having thus described my invention, I claim—

1. In a glass or other furnace in which the currents of air and gas, by separate flues or conduits, are led through separate regenerator-chambers into a combustion chamber, from whence, through regenerator-chambers and draft-conduits the products of combustion are let to outside air, an auxiliary regenerator-chamber, and means for connecting the currents of air or gas, or the products of combustion, with the auxiliary chamber, at the same time disconnecting the currents of air or gas or the draft-current from a main regenerator, so that an auxiliary chamber can be used instead of a main chamber, substantially as described.

2. In a furnace in which the currents of air and gas, by separate flues or conduits, are led through separate regenerator-chambers into a combustion-chamber, from whence, through separate regenerator-chambers and draft-conduits the products of combustion are let to outside air, the combination of auxiliary chambers X and Y, constructed and arranged as described, flues 1, 2, 3, and 4, doors M and N, openings W W, butterfly-valves H H, air and gas regulating valves E F, a draft-stack having draft-regulating valve G, and removable brick wall or arch L, arranged and operating substantially as described, and for the purposes set forth.

3. In a furnace in which the currents of air and gas, by separate flues or conduits, are led through separate regenerator-chambers into a combustion-chamber, from whence, through separate regenerator-chambers and draft-conduits the products of combustion are let to outside air, the combination of ports A' B' and A' B' in combustion-chamber, auxiliary chamber X Y, constructed and arranged as described, flues 1, 2, 3, and 4, doors M and N, openings W W, butterfly-valves H H, air and gas regulating valves E F, a draft-stack having a draft-regulating valve, G, and removable brick wall or arch, L, arranged and operating substantially as described, and for the purposes set forth.

In testimony whereof I have affixed my signature, in presence of two witnesses, this 5th day of December, 1884.

EDWARD WALSH, JR.

Witnesses:
PAUL BAKEWELL,
J. W. RIDDLE.